March 11, 1930.  A. ESAU  1,750,000
GENERATOR OF SHORT ELECTRIC WAVES
Filed Nov. 2, 1926
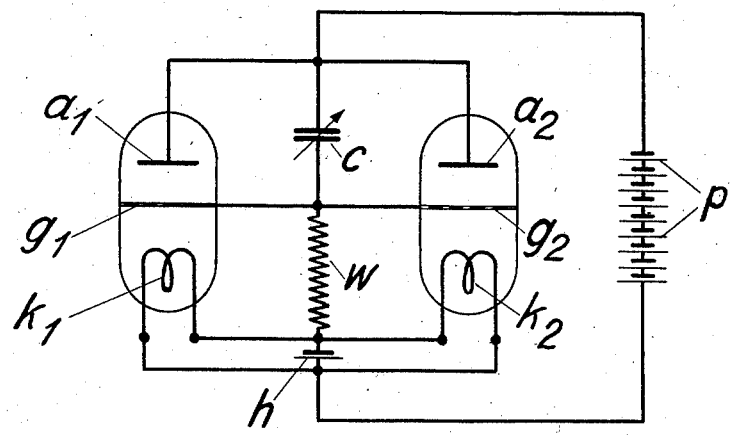
Inventor
Abraham Esau
per
Attorney Patented Mar. 11, 1930

1,750,000

UNITED STATES PATENT OFFICE

ABRAHAM ESAU, OF JENA, GERMANY

GENERATOR OF SHORT ELECTRIC WAVES

Application filed November 2, 1926, Serial No. 145,737, and in Germany November 10, 1925.

This invention relates to means for the generation of short electric waves in high-frequency technics and more particularly to an arrangement whereby large quantities of energy may be obtained. When generating very short waves the constants of the oscillating circuit decisive for the wave-length obtained are constituted merely by the inherent inter-electrode capacities, the grid-anode capacity especially, of an oscillating vacuum tube and the self-inductance of the connecting wires, a capacity at will being inserted in series with the inherent tube capacity in order to further shorten the length of the generated waves. Obviously the high-frequency power obtainable by such an arrangement becomes smaller the shorter the wave length, i. e., the smaller the electric dimensions of the circuits; and according to my invention I provide two tubes connected in a manner to be described hereinafter, whereby the energy available may be largely increased.

The invention is more fully set forth with reference to the accompanying drawing, it being understood that other modifications of the arrangement and the application thereof may be made without departing from the scope of the appended claims. Two three-electrode vacuum tubes of substantially equal dimensions having cathodes $k_1$ and $k_2$, grid electrodes $g_1$ and $g_2$ and anodes $a_1$ and $a_2$ respectively, have their corresponding electrodes connected by conducting wires. By $w$ is indicated a high resistance or choking device placed symmetrically to the tubes between the connecting wires of the grids and cathodes respectively. This arrangement—assuming capacity $c$ to be absent—is similar to the push-pull generating connection well known in short-wave work. The two inherent grid-anode capacities of the tubes are here in series constituting, together with their connecting wires an oscillatory circuit adapted to generate excessively short electric waves. According to my invention a capacity $c$ is inserted between the connecting wires of the anode and grid electrodes respectively, thus dividing the circuit formed by the two inherent tube capacities, grid-anode and their connecting wires into two electrically symmetrical circuits $a_1$ $c$ $g_1$ and $a_2$ $c$ $g_2$ having substantially equal natural frequencies. The advantage of this arrangement over the afore-mentioned arrangement without the capacity $c$ consists in that while allowing still shorter waves to be generated, a capacity $c$, which may be given any value and may be made variable may be used as a shortening condenser in series with the respective grid-anode capacities of the tubes, whereas with the arrangements employed before the inherent tube capacities were of fixed value. At the same time an additional advantage is gained, in that double the energy of a single tube is obtained. A load circuit (aerial) may be coupled in any known way (by direct, inductive, capacity or mixed coupling) with the two oscillating circuits. $p$ is a plate-voltage battery connected symmetrically to both tubes as indicated in the drawing. $h$ is the A-battery.

What I claim is:

1. An apparatus for the generation of short electric waves comprising in combination two three-electrode vacuum tubes of equal dimensions having incandescent cathodes, grid electrodes and anodes, wires connecting the corresponding electrodes of said tubes, and a capacity inserted symmetrically to said tubes between the wires connecting said grid and said anode electrodes whereby two oscillating circuits constituted by the respective inherent grid-anode capacities in series with part of said connecting wires and with said capacity of substantially the same natural frequency are obtained, and means in said circuits for always maintaining the anodes at a higher positive potential than the grid electrodes.

2. In an apparatus according to claim 1, wherein the means for maintaining the proper relative anode-grid tensions comprises a high resistance connected symmetrically to both tubes between points of the wires connecting the grid and cathode respectively.

In testimony whereof I have affixed my signature.

ABRAHAM ESAU.